(12) United States Patent
Patil et al.

(10) Patent No.: US 11,143,428 B2
(45) Date of Patent: Oct. 12, 2021

(54) HVAC UNIT FAN CONTROL SYSTEMS AND METHODS

(71) Applicant: Johnson Controls Technology Company, Auburn Hills, MI (US)

(72) Inventors: Gaurav S. Patil, Pune (IN); Naushad Parapurath Monangat, Pune (IN); John L. McElvany, Norman, OK (US); Karan Garg, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 153 days.

(21) Appl. No.: 16/265,734

(22) Filed: Feb. 1, 2019

(65) Prior Publication Data

US 2020/0240672 A1 Jul. 30, 2020

Related U.S. Application Data

(60) Provisional application No. 62/796,455, filed on Jan. 24, 2019.

(51) Int. Cl.
*F24F 11/81* (2018.01)

(52) U.S. Cl.
CPC ........... *F24F 11/81* (2018.01); *F24F 2221/16* (2013.01)

(58) Field of Classification Search
CPC ........ F24F 2110/40; F24F 7/007; F24F 11/00; F24F 11/0001; F24F 11/50; F24F 11/54; F24F 11/62; F24F 11/63; F24F 11/64; F24F 11/88; F24F 11/81
USPC .............................. 454/58, 61–62, 340, 343
See application file for complete search history.

(56) References Cited

U.S. PATENT DOCUMENTS

| 6,328,095 | B1   | 12/2001 | Felber et al. | |
| 7,147,168 | B1 * | 12/2006 | Bagwell | B08B 15/00 |
| | | | | 236/49.3 |
| 8,842,000 | B2 * | 9/2014 | Day | F04D 27/008 |
| | | | | 340/501 |
| 9,423,128 | B2 * | 8/2016 | Gans | F24F 11/72 |
| 2010/0273121 | A1 * | 10/2010 | Gleason | F27D 7/04 |
| | | | | 432/4 |

\* cited by examiner

*Primary Examiner* — Steven B McAllister
*Assistant Examiner* — Ko-Wei Lin
(74) *Attorney, Agent, or Firm* — Fletcher Yoder, P.C.

(57) ABSTRACT

The present disclosure relates to a heating, ventilating, and air conditioning (HVAC) unit configured to supply conditioned air to a conditioned space. The HVAC unit includes a first exhaust fan capable of operating at variable speeds and a second constant-speed fan. The HVAC unit also includes a controller configured to determine a target airflow to be provided to the conditioned space, cause actuation of the first exhaust fan at a variable fan speed when the target airflow is greater than zero, and cause actuation of the second exhaust fan when the target airflow is greater than an airflow threshold.

26 Claims, 5 Drawing Sheets

HVAC UNIT FAN CONTROL SYSTEMS AND METHODS

CROSS REFERENCE TO RELATED APPLICATIONS

This application claims priority from and the benefit of U.S. Provisional Application Ser. No. 62/796,455, entitled "HVAC UNIT FAN CONTROL SYSTEMS AND METHODS," filed Jan. 24, 2019, which is hereby incorporated by reference in its entirety for all purposes.

BACKGROUND

The present disclosure relates generally to heating, ventilation, and/or air conditioning (HVAC) systems and, more specifically, to controlling operation of multiple fans in an HVAC unit.

A wide range of applications exist for HVAC systems. For example, residential, light commercial, commercial, and industrial HVAC systems are used to control temperatures and/or air quality in residences or other types of buildings. Certain HVAC units can be dedicated to either heating or cooling, although many HVAC units are capable of performing both functions. HVAC units may also provide ventilation to a conditioned interior space. In general, HVAC systems operate by implementing a thermodynamic cycle in which a refrigerant undergoes alternating phase changes to remove heat from or deliver heat to a conditioned interior space of a building. Heating may also be provided by heat pumps, gas furnace heat exchangers, electric resistance heat, or steam or hot water coils. Similar systems are used for vehicle cooling, and as well as for other types of refrigeration, for example, used in refrigerators, freezers, and/or chillers.

In some HVAC systems, an HVAC unit may supply the conditioned air to a conditioned space at least in part by actuating a fan. To facilitate controlling actuation and, thus, supply of the conditioned air, at least in some instances, the fan motor may be coupled to a motor drive, such as a variable frequency drive (VFD) or a variable speed drive (VSD). For example, the motor drive may adjust supply of electrical power to the fan motor to control speed and/or torque of fan blades coupled to the fan motor. However, at least in some instances, utilizing multiple motor drives or a single fan motor to control supply of conditioned air from an HVAC unit may be inefficient, resource-intensive, and/or demand more physical space than otherwise desired.

SUMMARY

The present disclosure relates to a heating, ventilating, and air conditioning (HVAC) unit configured to supply conditioned air to a conditioned space. The HVAC unit includes a first exhaust fan capable of operating at variable speeds and a second constant-speed fan. The HVAC unit also includes a controller configured to determine a target airflow to be provided to the conditioned space, cause actuation of the first exhaust fan at a variable fan speed when the target airflow is greater than zero, and cause actuation of the second exhaust fan when the target airflow is greater than an airflow threshold.

The present disclosure also relates to a tangible, non-transitory, computer-readable medium storing instructions that, when executed by processing circuitry, cause the processing circuitry to receive data regarding an air pressure within a conditioned space, receive data indicative of a pressure setpoint associated with the conditioned space, determine a target airflow to be provided to the conditioned space based on a difference between the air pressure and the pressure setpoint, and control a first exhaust fan capable of operating at variable speeds and a second exhaust fan. The instructions, when executed, are configured to cause the processing circuitry to control the first exhaust fan and the second exhaust fan by causing actuation of the first exhaust fan when the target airflow is greater than zero and causing actuation of the second exhaust fan at a constant fan speed when the target airflow is greater than an airflow threshold.

The present disclosure further relates to a control system of a heating, ventilating, and air conditioning (HVAC) system that includes control circuitry configured to determine a target airflow to be provided by an HVAC unit to a serviced space. The control circuitry is also configured to cause actuation of a first exhaust fan in the HVAC unit capable of operating at variable speeds when the target airflow is greater than zero. Additionally, the control circuitry is configured to cause actuation of a second, constant speed fan in the HVAC unit when the target airflow is greater than an airflow threshold.

DRAWINGS

DETAILED DESCRIPTION

Figure 1:
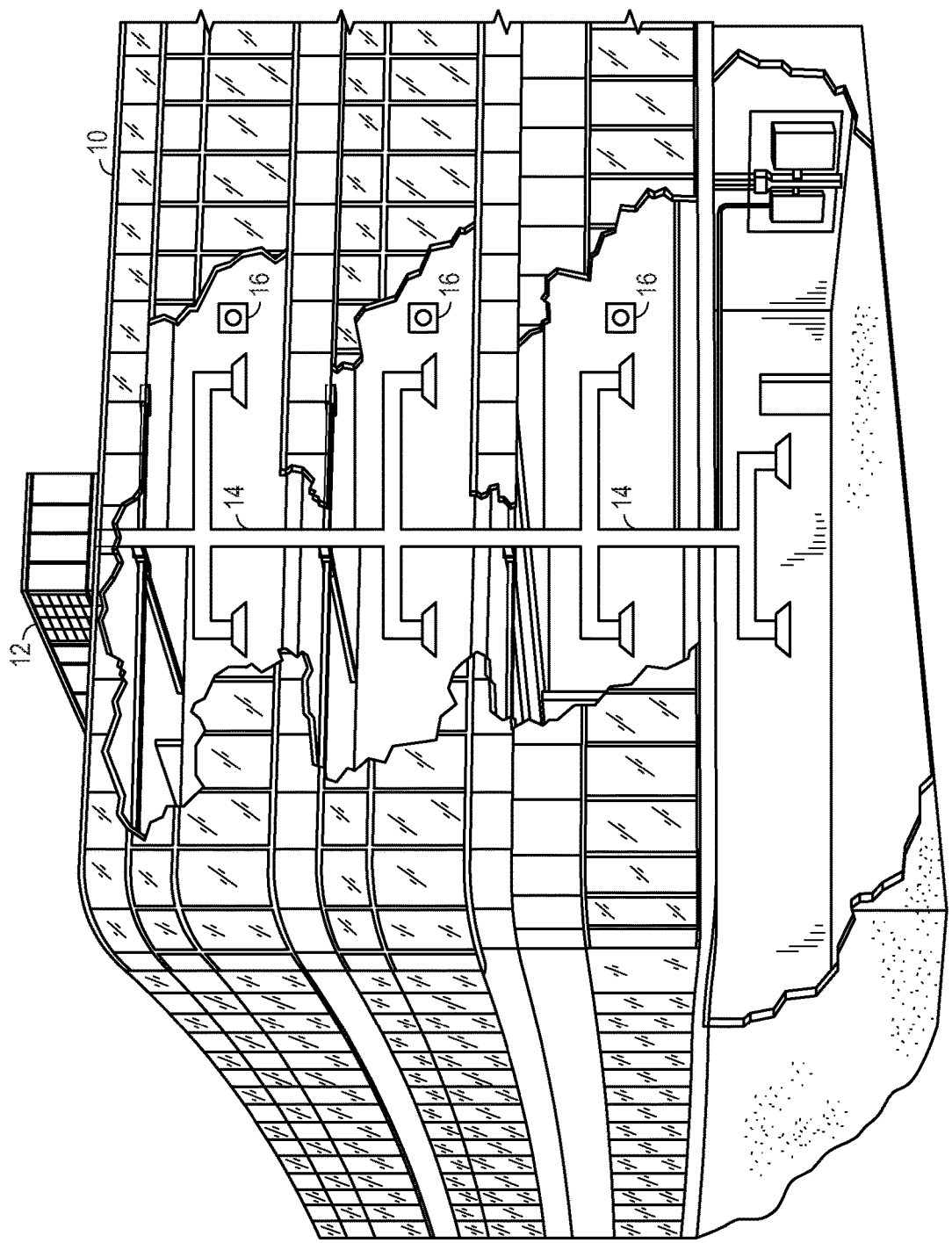
FIG. 1 is a perspective view of an example of a heating, ventilation, and/or air conditioning (HVAC) system for building environmental management, in accordance with aspects of the present disclosure.

Generally, a heating, ventilation, and/or air conditioning (HVAC) system may operate to facilitate controlling air conditions, such as temperature and/or humidity, present within a serviced space. To facilitate controlling air conditions, an HVAC system may include an HVAC unit with equipment that operates to produce and/or facilitate supplying conditioned air to the serviced space. For example, equipment in the HVAC unit may include a compressor that, during operation or while running, circulates refrigerant that extracts heat from input air, thereby producing cooled air, which may then be supplied to the serviced space. Additionally or alternatively, the equipment in the HVAC unit may include a furnace that, during operation or while running, combusts fuel to inject heat into input air, thereby producing heated air, which may then be supplied to the serviced space.

To facilitate supplying conditioned air to the serviced space, equipment in the HVAC unit may additionally include one or more fan assemblies. In particular, a fan assembly may include fan blades and a fan motor, which operates to actuate the fan blades to draw air into the HVAC unit and/or expel air out from the HVAC unit. In other words, in some embodiments, actuation speed of the fan assembly may be controlled to control the flow rate of conditioned air supplied to the serviced space, while in other embodiments, actuation speed of the fan assembly may be controlled to control the flow rate of air that is expelled (e.g., exhaust air) from an HVAC unit.

To control operation of its equipment, an HVAC system often includes a control system. In some embodiments, the control system may be distributed between multiple control devices. For example, the control system may include an interface control device, such as a thermostat, which determines air conditions, such as temperature and/or air pressure, measured in the serviced space and/or enables a user, such as a homeowner or a service technician, to set target values or setpoints for the air conditions.

Additionally, the control system may include an equipment control device, for example, implemented by a controller and/or other control circuitry on a control board or control panel of an HVAC unit to facilitate controlling operation of equipment deployed in the HVAC unit. For example, the controller may control supply of electrical power to a fan assembly, thereby controlling actuation speed of its fan blades and, thus, supply of air from the HVAC unit to the serviced space. In fact, to facilitate achieving target air conditions, the HVAC unit may be implemented to enable varying flow rate of supply air to the serviced space. For example, the HVAC unit may be implemented to selectively output 10% of its maximum flow rate capacity, 20% of its maximum flow rate capacity, and so on up to its maximum (100%) flow rate capacity.

To facilitate controlling supply of electrical power to a fan assembly, the controller may be communicatively coupled to one or more switching devices electrically coupled between a power source and a fan motor of the fan assembly. For example, the fan assembly may be electrically coupled to a motor drive, such as a variable frequency drive (VFD) or variable speed drive (VSD), which includes semiconductor switching devices communicatively coupled to the controller. In this manner, the controller may controllably vary speed of the fan assembly by controlling magnitude and/or frequency of electrical power supplied to its fan motor via control signals output to the semiconductor switching devices in the motor drive. However, at least in some instances, implementing a motor drive and a single fan assembly in an HVAC unit to produce the full range of its selectable flow rates may affect (e.g., increase) implementation associated cost, for example, by necessitating a motor drive and/or motor with a higher power rating and, thus, a larger physical footprint, more manufacturing steps, a higher component count, and/or greater motor loss.

Accordingly, to facilitate reducing implementation associated cost, the present disclosure provides techniques for implementing and/or operating an HVAC unit with multiple fan assemblies and a motor drive. For example, the HVAC unit may include a first fan assembly electrically coupled to the motor drive and a second fan assembly electrical coupled to a switching device. In some embodiments, a controller may turn on the second fan assembly at least in part by instructing the switching device to electrically connect a power source to a fan motor of the second fan assembly and turn off the second fan assembly at least in part by instructing the switching device to electrically disconnect the power source from the fan motor. In other words, when turned on, fan blades of the second fan assembly may be actuated at a constant speed. As used herein, a "constant speed" describes a substantially or relatively constant fan speed that produces a substantially or relatively constant flow rate. In other words, in some instances, actuating a constant speed fan, such as the second fan assembly, may result in slight variations in fan speed and, thus, produced flow rate, but may nevertheless be considered a constant speed fan for the purposes of the present disclosure.

Similarly, the controller may turn on the first fan assembly at least in part by instructing switching devices in the motor drive to supply electrical power to a fan motor of the first fan assembly and turn off the first fan assembly at least in part by instructing the switching devise in the motor drive to block supply of electrical power to the fan motor. However, in some embodiments, the motor drive may enable the controller to vary actuation speed of the first fan assembly, for example, by switching the switching devices in the motor drive to adjust frequency of electrical power supplied to its fan motor. In other words, when turned on, fan blades of the first fan assembly may be actuated at a controllably variable speed and, thus, produce a controllably variable flow rate.

By implementing multiple fan assemblies in an HVAC unit, total flow rate output from the HVAC unit may be a combination of the flow rates produced by each of the multiple fan assemblies. As such, implementing one or more constant speed fan assemblies in addition to a variable speed fan assembly may enable maximum flow rate of the variable speed fan assembly to be less than a maximum total flow rate of the HVAC unit. In other words, implementing one or more constant speed fan assemblies may enable magnitude of electrical power to be supplied to the variable speed fan assembly to be reduced, for example, compared to a single variable speed fan assembly implemented to provide the full range of selectable flow rates. At least in some instances, this may facilitate reducing implementation associated cost of the HVAC unit, for example, by enabling use of a motor drive and a variable speed fan assembly with a lower power rating and, thus, a smaller physical footprint, fewer manufacturing steps, a smaller component count, and/or less motor loss.

As described above, a control system may control operation of equipment, such as the motor drive and/or a fan assembly, based at least in part on target air conditions or air condition setpoints associated with a serviced space. For example, the control system may determine a target air pressure associated with the serviced space and a measured air pressure sensed in the serviced space. Additionally, based at least in part on deviation of measured air conditions from a corresponding target air condition, the control system may determine a target flow rate of air to be supplied from an HVAC unit to the serviced space and control operation of multiple fan assemblies deployed in the HVAC unit accordingly. Similarly, based at least in part on deviation of measured air conditions from a corresponding target air condition, the control system may determine how multiple fan assemblies should be operated to expel air from an HVAC unit and control the operation of multiple fan assemblies accordingly.

For example, when an HVAC unit includes a variable speed fan assembly and a constant speed fan assembly, the control system may control operation of the fan assemblies based at least in part on the target flow rate relative to a flow rate threshold. In some embodiments, the flow rate threshold may be equal to the constant flow rate produced by the constant speed fan assembly while on. For example, when the HVAC unit includes a single constant speed fan assembly, the constant flow rate may be half of a maximum total flow rate of the HVAC unit.

When the target flow rate is not greater than the flow rate threshold, the control system may control operation of the variable speed fan assembly to provide the target flow rate from the HVAC unit. In other words, in some embodiments, the control system may maintain each constant speed fan assembly in the HVAC unit off when the target flow rate is not greater than the flow rate threshold. On the other hand, when the target flow rate is greater than the flow rate threshold, the control system may turn on a constant speed fan assembly, thereby contributing the constant flow rate to the total flow rate output from the HVAC unit. Additionally, when the target flow rate is greater than the flow rate threshold, the control system may control operation of the variable speed fan assembly to produce a variable flow rate, which in combination with the constant flow rate produces the target flow rate. Furthermore, fan assemblies utilized to expel air, such as exhaust it, from the HVAC unit may similarly be controlled based a comparison of the target flow rate to the flow rate threshold. For instance, in some embodiments, the control system may maintain each constant speed fan assembly in the HVAC unit off when the target flow rate is not greater than the flow rate threshold. Conversely, when the target flow rate is greater than the flow rate threshold, the control system may turn on a constant speed fan assembly. In this manner, as will be described in more detail below, an HVAC system may be implemented and/or operated to facilitate reducing implementation associated cost and/or improving operational efficiency, for example, by enabling a smaller physical footprint, fewer manufacturing steps, a smaller component count, and/or less motor loss.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10. However, in other embodiments, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
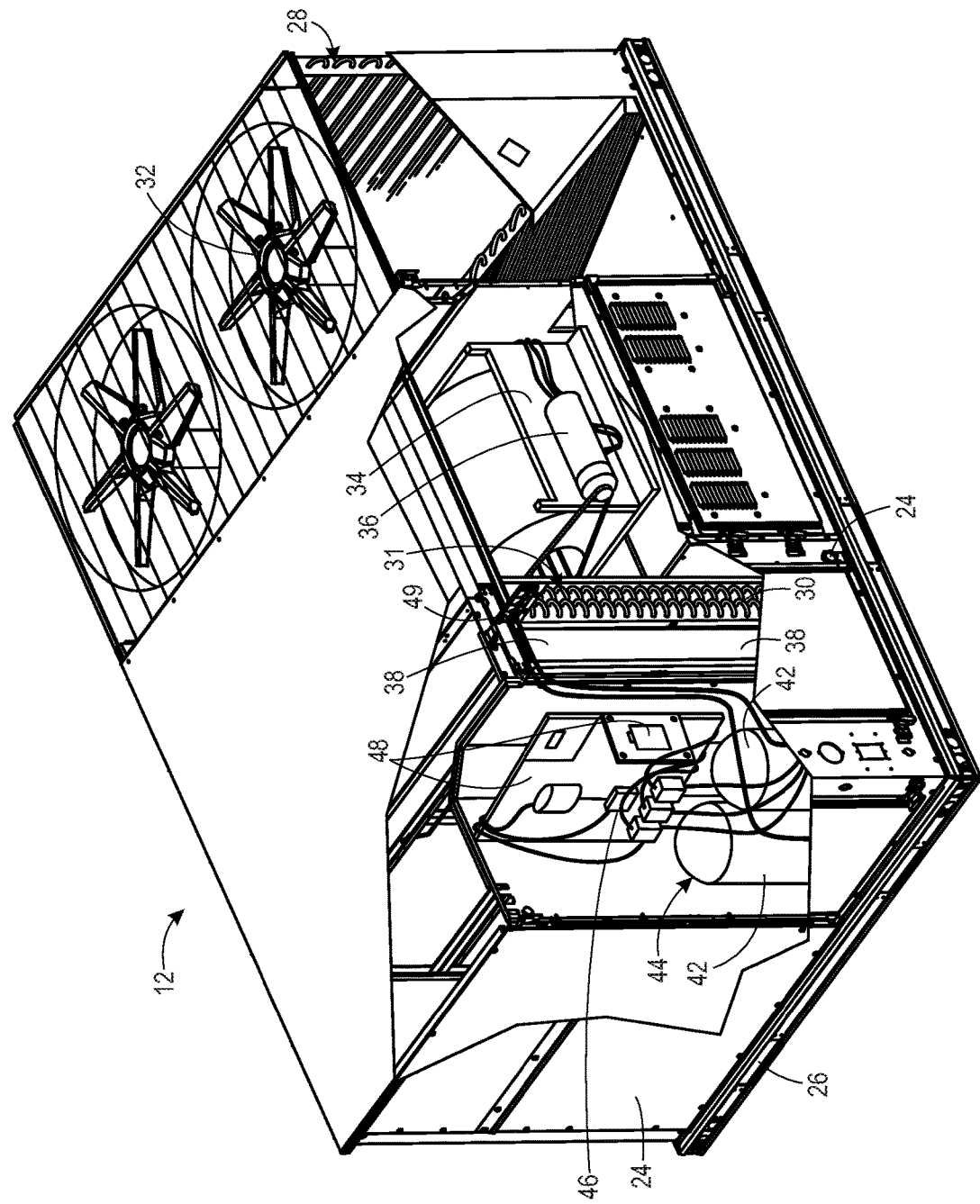
FIG. 2 is a perspective view of an example of a packaged HVAC unit, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to block contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and/or alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
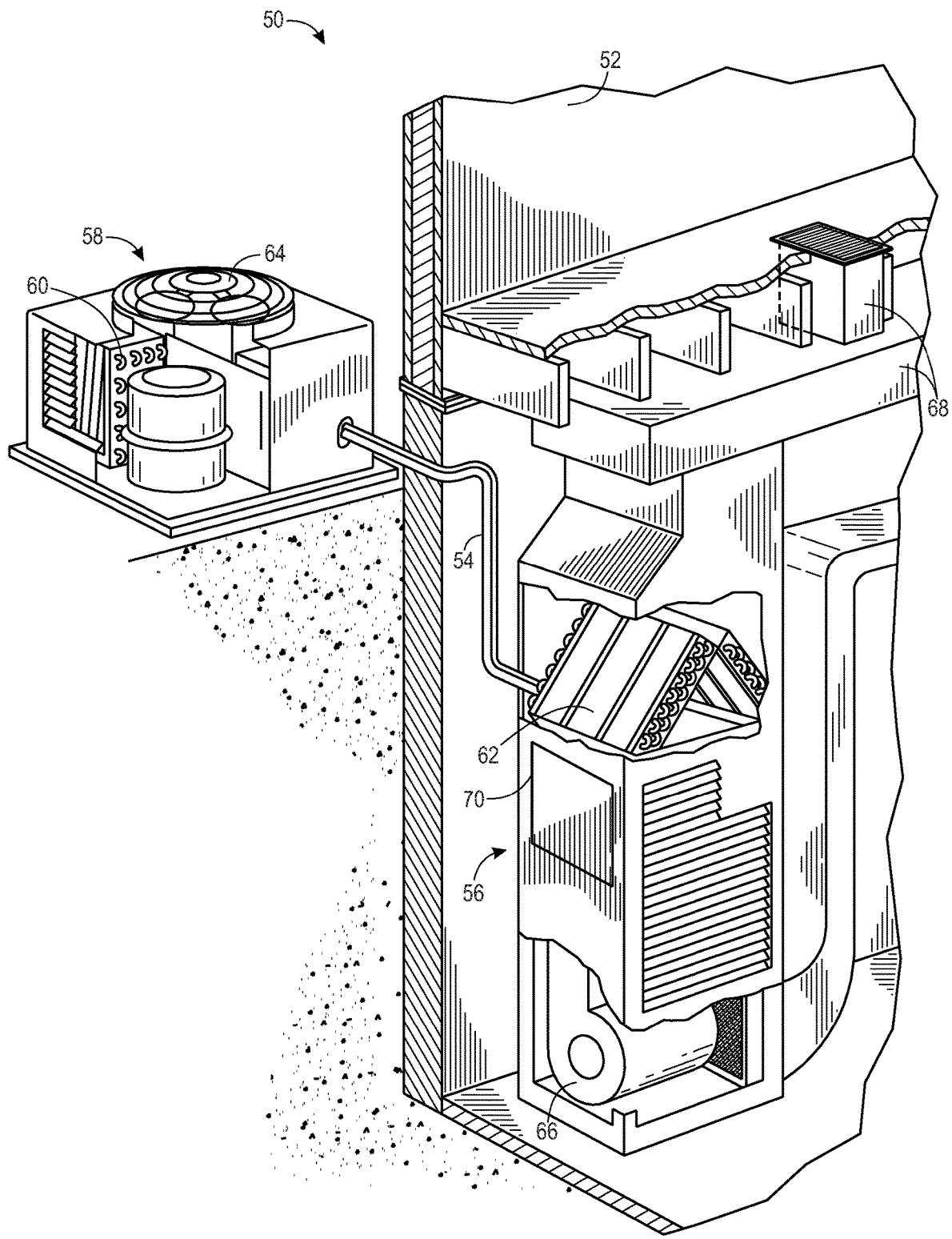
FIG. 3 is a perspective view of an example of a split, residential HVAC system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that fluidly couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to block leaves and/or other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
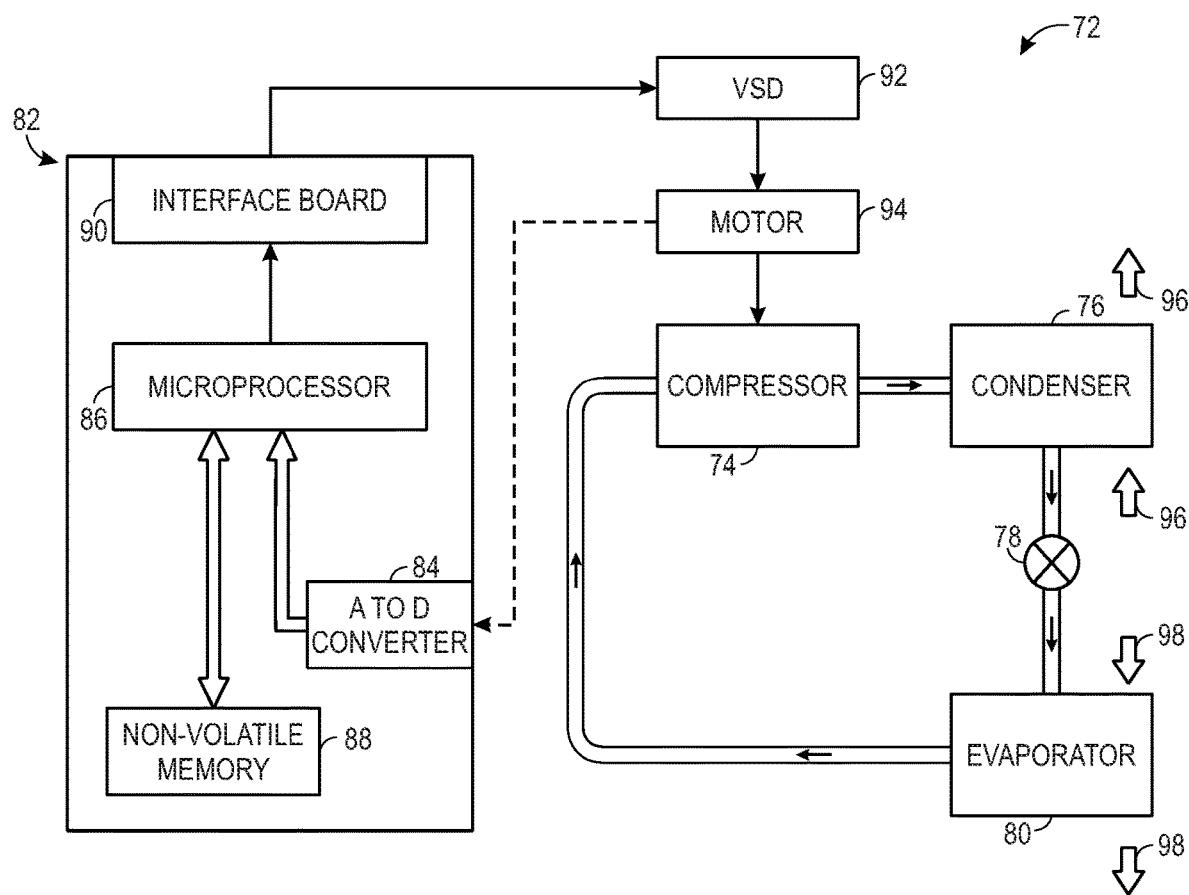
FIG. 4 is a schematic diagram of an example of a vapor compression system that may be used in the HVAC systems of FIGS. 2 and 3, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, in some embodiments, an HVAC unit in an HVAC system may include a controller (e.g., on a control board or control panel) that controls operation of the HVAC unit. In particular, in some embodiments, the controller may control one or more fan motors that drive fans used to intake air from an environment outside of the HVAC unit and/or to expel air into the exterior environment. In other words, in some embodiments, the fans may be exhaust fans.

As discussed below, the controller may be communicatively coupled to several fan motors. In some embodiments, a subset (e.g., one) of the fan motors may be coupled to a motor drive, such as a variable frequency drive (VFD) or a variable speed drive (VSD). The controller may determine a target airflow to provide to a conditioned space, for example, based at least in part on air pressure present within the conditioned space. Furthermore, the controller may regulate the operation of the fan motors based on the target airflow to be provided to the conditioned space. For example, in one embodiment described below, when the target airflow is equal to or less than half of the maximum airflow rating of an HVAC unit 12, the controller may cause a fan motor coupled to the VFD to run while maintaining another fan motor off. On the other hand, when the target airflow is greater than half of the maximum airflow rating, the controller may cause both fan motors to run. Because a VFD may only be utilized to control a subset of the fan motors, a VFD with a relatively smaller size, capacity, and cost may be utilized, for example, compared to systems in which each of the multiple fan motors are coupled to a VFD.

Figure 5:
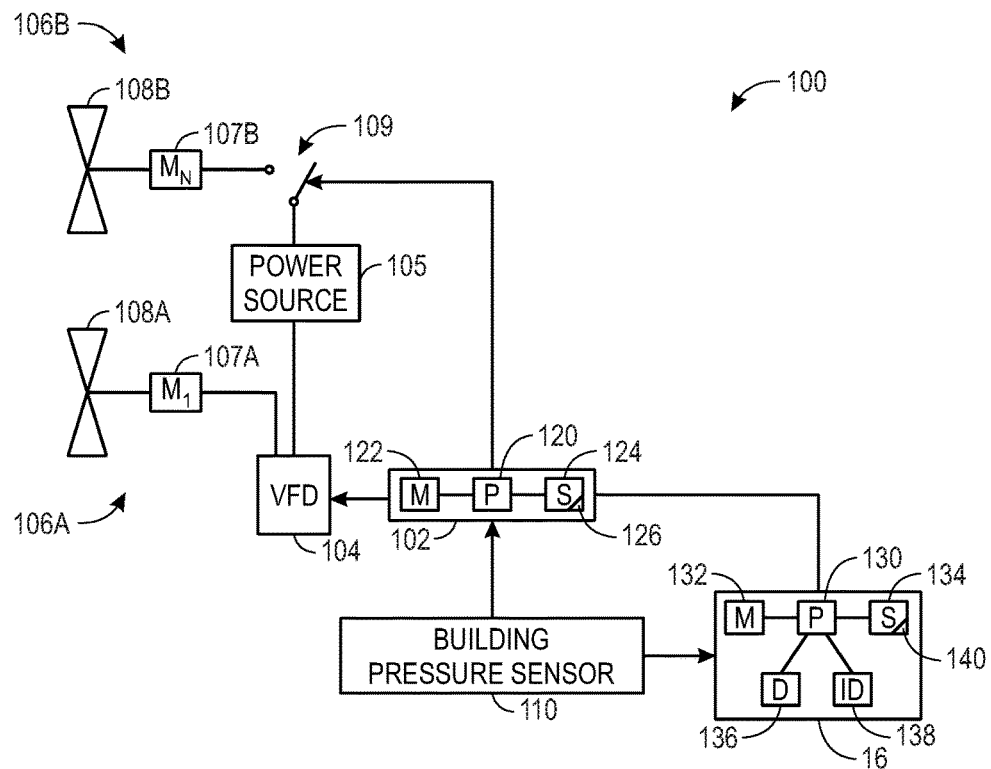
FIG. 5 is a schematic diagram of an example of an HVAC system that includes a variable speed fan and one or more fixed speed fans, in accordance with aspects of the present disclosure.

To help illustrate, a schematic view of an HVAC system 100, which includes a controller 102, a VFD 104, a power source 105, fan assemblies 106 each including a motor 107 and one or more fan blades 108, a switch 109, a control device 16, and a pressure sensor 110, is shown in FIG. 5. In some embodiments, the HVAC system 100 may be included in an HVAC unit 12 and a space that received conditioned air from the HVAC unit. For example, in some embodiments, the HVAC system 100 may be implemented in the HVAC unit 12 and building 10 illustrated in FIG. 1, and the fan assemblies 106 may correspond to the fans 32. In other embodiments, the HVAC system 100 may be implemented in a split HVAC system that may be utilized to provide conditioned air to a residence, such as a house, as discussed above.

The controller 102, which may be implemented on the control board 48 or the control panel 82 of the HVAC unit 12, includes processing circuitry 120, memory 122, and storage 124. The various components of the controller 102 described in FIG. 5 may include hardware elements, such as circuitry, software elements, such as a tangible, non-transitory computer-readable medium storing instructions, or a combination of both hardware and software elements. It should be noted that the various depicted components may be combined into fewer components or separated into additional components. For example, the memory 122 and the storage 124 may be included in a single component.

As depicted, the processing circuitry 120 is operably coupled with the memory 122 and the storage 124. Thus, the processing circuitry 120 may execute instructions stored in the memory 122 and/or the storage 124 to perform operations, such as controlling operation of the motors 107. As such, the processing circuitry 120 may include one or more general purpose microprocessors, one or more application specific integrated circuits (ASICs), one or more field programmable logic arrays (FPGAs), or any combination thereof. The instructions on the storage 124 that the processing circuitry 120 may execute may include an application 126 that enables the processing circuitry 120 to perform functions described below. For example, the application 126 may be executed to determine a target airflow to be provided to a conditioned space and to control operation of the fan motors 107 accordingly. Additionally, in embodiments in which the fan assemblies 106 are utilized to expel air from the HVAC system 100, the fan motors 107 may likewise be controlled based on the target airflow to be provided to the conditioned space.

In addition to instructions, the memory 122 and/or the storage 124 may store data to be processed by the processing circuitry 120. Thus, in some embodiments, the memory 122 and/or the storage 124 may include one or more tangible, non-transitory, computer-readable mediums. For example, the memory 122 may include random access memory (RAM), and the storage 124 may include read only memory (ROM), rewritable non-volatile memory such as flash memory, hard drives, optical discs, and/or the like.

As in the depicted example, the VFD 104 may be communicatively coupled to controller 102 and electrically coupled between the power source 105 and a first fan motor 107A of a first fan assembly 106A. In other words, the VFD 104 may receive electrical power from the power source 105 and supply electrical power to the first fan motor 107A to actuate a first one or more fan blades 108A of the first fan assembly 106A based at least in part on control signals received from the controller 102. In particular, in some embodiments, the VFD 104 may modulate the amount of electrical power provided to the first motor 107A to adjust actuation speed of the first fan blades 108A and, thus, air flow produced by the first fan assembly 106A. For example, the VFD 104 may include a converter with switching devices that varies voltage and/or frequency of electrical power supplied to the first fan motor 107A based at least in part on switching timing of the switching devices.

The motors 107 may include any type of electric motor that can be powered by a VSD or directly from an AC or DC power source, such as a switched reluctance motor, an induction motor, an electronically commutated permanent magnet motor, or another suitable motor. As discussed above, the motor 107A is coupled to the VFD 104. Accordingly, the motor 107A may operate at a variety of settings. For example, the VFD 104 may enable the motor 107A to be operated at any rotational speed between zero and the particular rotational speed. In other words, the motor 107A and fan 108A may operate at a variable speed.

The HVAC system 100 may also include one or more other fan assemblies 106B that not electrically coupled to the VFD 104. In some embodiments, there may be a single motor 107B, whereas in other embodiments, more than one motor 107B may be employed. For example, there may be one, two, three, four, five, or more than five other motors 107B. Additionally, there may be a number of fans 108B and switches 109 that matches the number of motors 107B. For instance, there may be one motor 107B for each fan 108B and switch 109 included in the HVAC system 100 or an HVAC unit 12.

Since the other motors 107B are not electrically coupled to the VFD 104, in some embodiments, the one or more other motors 107B may operate at a fixed or constant speed. Each of the motors 107B may be coupled to a corresponding switch, such as the switch 109, that may be utilized to control whether electrical is supplied to the motors 107B. The switches 109 may be relays, contacts, or other types of switching devices. In some embodiments, the controller 102 may output a control signal that instructs the switch 109 to switch to or maintain a connected position, thereby enabling supply of electrical power from the power source 105 to a corresponding fan motor 107B. Additionally or alternatively, the controller 102 may output a control signal that instructs the switch 109 to switch to or maintain a disconnected position, thereby blocking supply of electrical power from the power source 105 to a corresponding fan motor 107B and, thus, maintaining a corresponding fan assembly 106B off. When electrically coupled to the power source 105, the motor 107B may operate to actuate corresponding fan blades 108B at a particular speed.

The pressure sensor 110, which may be communicatively coupled to the controller 102 and/or the control device 16, may be a transducer, switch, or other type of sensor that can sense air pressure within the conditioned space. For example, in some embodiments, the pressure sensor 110 detect the air pressure within a particular area, such as a room, of the conditioned space. The pressure sensor 110 may provide data indicative of the sensed air pressure to the controller 102 and/or the control device 16.

The control device 16, which may disposed within the conditioned space, may include processing circuitry 130, memory 132, storage 134, a display 136, and input devices 138. The various components of the control device 16 described in FIG. 5 may include hardware elements, such as circuitry, software elements, such as a tangible, non-transitory computer-readable medium storing instructions, or a combination of both hardware and software elements. It should be noted that the various depicted components may be combined into fewer components or separated into additional components. For example, the memory 132 and the storage 134 may be included in a single component.

As depicted, the processing circuitry 130 is operably coupled with the memory 132 and the storage 134. Thus, the processing circuitry 130 may execute instructions stored in the memory 132 and/or the storage 134 to perform operations, such as controlling air flow supplied to a conditioned space. As such, in some embodiments, the processing circuitry 130 may include one or more general purpose microprocessors, one or more ASICs, one or more FPGAs, or any combination thereof. The instructions on the storage 134 that the processing circuitry 120 may execute may include an application 140 that enables to the processing circuitry 120 to perform functions described below. For example, the application 140 may be executed to determine air pressure within the conditioned space and/or an air pressure setpoint.

In addition to instructions, the memory 132 and/or the storage 134 may store data to be processed by the processing circuitry 130. Thus, in some embodiments, the memory 132 and/or the storage 134 may include one or more tangible, non-transitory, computer-readable mediums. For example, the memory 132 may include random access memory (RAM), and the storage 134 may include read only memory (ROM), rewritable non-volatile memory such as flash memory, hard drives, optical discs, and/or the like.

The control device 16 may be a thermostat, which may be used to designate one or more target air conditions, such as a temperature setpoint and/or an air pressure setpoint, for a conditioned space. The control device 16 also may be used to control the flow of air through a conditioned space, such as through the ductwork 14 of the building 10. The control device 16 may be used to regulate operation of one or more components of an HVAC unit, such as the HVAC unit 12. The control device 16 may also be used to regulate operation of components, such as dampers and fans, within the building 10 that may control flow of air through and/or from the ductwork 14.

The control device 16 may also include a display 136 and input devices 138. In some embodiments, the display 136 may display one or more graphical user interfaces (GUIs) that provide a visual representation of one or more air conditions, such as temperature and/or air pressure, sensed in a conditioned space. Additionally, in some embodiments, the display 136 may display one or more graphical user interfaces (GUIs) that provide a visual representation of one or more target air conditions, such as a temperature setpoint and/or an air pressure setpoint, associated with the conditioned space. Furthermore, in some embodiments, the display 136 may display one or more graphical user interfaces (GUIs) that provides a visual representation of equipment settings, such as a fan speed setting.

In some embodiments, the control device 16 may enable a user, such as a homeowner or a service technician, to adjust equipment setting via its one or more input devices 138. For example, a user may change a fan settings, a temperature setting, and/or a humidity settings using the input devices 138. In some embodiments, the input devices 138 may include buttons, dials, and/or switches. Additionally, in some embodiments, the input devices 138 may include one or more touch sensors, for example, disposed on or integrated in the display 136.

The control device 16 may determine a pressure set point for a particular combination of air settings. More specifically, based on qualities that air within the conditioned space should have and current qualities of the air, the control device 16 may determine a pressure of air that should be present within the conditioned space. For example, when air of a first temperature and first humidity are requested—for example, based on a user input received from the input devices 138—the control device 16 may determine a target air pressure for the conditioned space. The control device 16 may communicate the target air pressure to the controller 102.

In operation, the controller 102 may receive data from a control device 16, such as the target air pressure for the conditioned space, as well as data from the pressure sensor 110. The controller 102 may determine a pressure of air within the conditioned space based on the data from the pressure sensor 110. In other words, the controller 102 may receive an indication of the air pressure setpoint (e.g., target air pressure) from the control device 16 and an indication of the air pressure measured within the conditioned space from the pressure sensor 110.

The controller 102 may control the motors 107 based on the pressure indicated by the pressure sensor 110 and the pressure setpoint indicated by the control device 16. For example, utilizing the application 140, the processing circuitry 120 of the controller 102 may determine a target airflow, which may be an amount of air defined in cubic feet per minute (CFM) that should be provided to the conditioned space. Based on the target airflow, the controller 102 may determine how the motors 107 will be operated.

In particular, an HVAC unit that the controller 102 is associated with or included in may be have an air flow rating, which indicates the full (e.g., maximum) air flow capacity of the HVAC unit 12. For example, the airflow rating may be the combined air flow produced when each of the fan assemblies 106 is operating at its highest speed setting. In some embodiments, the controller 102 may control the operation of the motors 107 based at least in part on comparison of a target air flow relative to one or more airflow thresholds.

To help illustrate, Table 1 provides an example of how the controller 102 may control operation of multiple motors 107. In particular, Table 1 pertains to an embodiment of the HVAC system 100 in which there are two motors 107—namely a first motor 107A that may be operated at a variable speed and a second motor 107B that may be operated at a fixed speed. In other words, Table 1 pertains to an embodiment of the HVAC system 100 in which there are two fans 108, one of which is driven by the first motor 107A, and another of which is driven by the second motor 107B.

TABLE 1

| % of total airflow rating | % of total airflow rating provided by fan 1 (e.g., fan 108A) | % of total airflow rating provided by fan 2 (e.g., fan 108B) |
|---|---|---|
| 10 | 10 | 0 |
| 20 | 20 | 0 |
| 30 | 30 | 0 |
| 40 | 40 | 0 |
| 50 | 50 | 0 |
| 60 | 10 | 50 |
| 70 | 20 | 50 |
| 80 | 30 | 50 |
| 90 | 40 | 50 |
| 100 | 50 | 50 |

As shown in Table 1, the first fan 108A may solely provide the target airflow when the target airflow is less than or equal to one-half of the airflow rating of the HVAC unit 12. For example, when the target airflow is between 0% and 50% (inclusive of 50%) of the airflow rating, the controller 102 may send a command to the VFD 104 to provide the first motor 107A with electrical power corresponding to the target airflow. As such, the motor 107A may be driven to cause the fan 108A to provide the target airflow. In particular, the controller 102 may determine settings of the electrical power supplied to the motor 107A based on the application 126. For instance, the application may define a relationship of power supplied to the first motor 107A to an operating speed of the fan 108A and/or air flow produce by the fan 108A.

When the target airflow to be provided is greater than one-half of the total airflow rating, the controller 102 may activate the first motor 107A as well as the second motor 107B. In particular, the first motor 107A may be operated based on how much greater the target airflow is than one-half of the total airflow rating. For example, as shown in Table 1, when the target airflow is eighty percent of the total airflow rating, the controller 102 may activate the second fan assembly 106B to provide an amount of airflow equal to one-half of the total airflow rating and activate the first fan assembly 106A such that the first fan assembly 106A provides an amount of airflow equal to thirty percent of the total airflow rating.

It should be noted that, in embodiments in which the fan assemblies 106 are utilized to expel air from the HVAC system 100, such as when the fan assemblies 106 are exhaust fans, Table 1 may pertain to the operation of the fan assemblies 106. For example, the total airflow rating may relate to an amount of air to be expelled from the HVAC system, the values associated with the airflow provided by the first fan 108*a* and the second fan 108*b* may express relative amounts of exhaust air that each of the first fan 108*a* and second fan 108*b* expels from the HVAC system 100.

It should also be noted that, in some embodiments, when the target airflow to be provided is equal to one-half of the total airflow rating, the controller 102 may activate either the motor 107A or the motor 107B to provide an airflow. In other words, in some embodiments, when the target flow rate is 50% of the total airflow rating, the second fan assembly 106B may be used to provide the target air flow instead of the first fan assembly 106A. Since a VFD 104 generally produces some amount of loss, at least in some instances, providing the target airflow in this manner may facilitate improving operational efficiency, for example, by reducing power consumption due to the VFD 104 being off.

To help further illustrate, Table 2 provides another example of how the controller 102 may control operation of multiple motors 107. In particular, Table 2 pertains to an embodiment in which there are four motors 107 and four fans 108, of which a first fan 108A is driven by a first motor 107A, and each of the three other fans 108B is driven by a corresponding other motor 107B.

airflow to be provided by the HVAC system 100 minus fifty percent of the total airflow rating.

When the target airflow is between seventy-five percent and one-hundred percent, the controller may activate each of the motors 107B to cause each of the fans 108B to provide an amount of airflow equal to twenty-five percent of the total airflow rating. The controller 102 may also activate the motor 107A to cause the fan 108A to provide an amount of airflow, such as amount of airflow equal to the target airflow by the HVAC system 100 minus seventy-five percent of the total amount of airflow.

It should be noted that, in embodiments in which the fan assemblies 106 are utilized to expel air from the HVAC system 100, such as when the fan assemblies 106 are exhaust fans, Table 2 may still pertain to the operation of the fan assemblies 106. For example, the total airflow rating may relate to an amount of air to be expelled from the HVAC system, the values associated with the airflow provided by the fans 108 may express relative amounts of exhaust air that each of the fans 108 expel from the HVAC system 100.

While the examples discussed above pertain to embodiments of the HVAC system 100 employing two motors 107 and two fans 108 or four motor 107 and four fans 108, the presently disclosed techniques may be used in embodiments having a different number of motors 107 or fans 108. For example, a single motor 107A may generally be used to an provide amount of airflow between zero cubic feet per minute and x cubic feet per minute, where x corresponds to the total airflow rating of an HVAC unit associated with the

TABLE 2

| % of total airflow rating | % of total airflow rating provided by fan 1 (e.g., fan 108A) | % of total airflow rating provided by fan 2 (e.g., fan 108B) | % of total airflow rating provided by fan 3 (e.g., fan 108B) | % of total airflow rating provided by fan 4 (e.g., fan 108B) |
| --- | --- | --- | --- | --- |
| 10 | 10 | 0 | 0 | 0 |
| 20 | 20 | 0 | 0 | 0 |
| 30 | 5 | 25 | 0 | 0 |
| 40 | 15 | 25 | 0 | 0 |
| 50 | 25 | 25 | 0 | 0 |
| 60 | 10 | 25 | 25 | 0 |
| 70 | 20 | 25 | 25 | 0 |
| 80 | 5 | 25 | 25 | 25 |
| 90 | 15 | 25 | 25 | 25 |
| 100 | 25 | 25 | 25 | 25 |

In general, when the target airflow to be provided is between zero percent and twenty-five percent of the total airflow rating, the controller 102 may activate the first motor 107A to cause the fan 108A to provide the target airflow. When the target airflow is between twenty-five percent and fifty percent, the controller may activate one of the other motors 107B to cause one of the fans 108B to provide a target airflow equal to twenty-five percent of the total airflow rating. The controller 102 may also activate the first motor 107A to cause the first fan 108A to provide an amount of airflow, such as amount of airflow equal to the amount of airflow to be provided by the HVAC system 100 minus the amount of airflow provided by the other fan 108B.

When the target airflow is between fifty percent and seventy-five percent, the controller may activate two of the motors 107B to cause two of the other fans 108B to each provide an amount of airflow equal to twenty-five percent of the total airflow rating. The controller 102 may also activate the motor 107A to cause the fan 108A to provide an amount of airflow, such as amount of airflow equal to the target HVAC system 100 divided by the number of fans 108 included in the HVAC system 100. For instance, if the HVAC system 100 were to include six motors 107 and six fans 108, including a single motor 107A that drives a single fan 108A and five motors 107A that each drive one of five other fans 108B, the controller 102 may control the first motor 107A to cause the first fan 108A to provide an amount of airflow between zero cubic feet per minute and one-sixth of the total airflow rating.

When the target airflow to be provided is greater than the amount of airflow that can be provided by the fan 108A, the controller 102 may activate a number of the motors 107B based on the target airflow. For instance, continuing with the example in which six motors 107 and six fans 108 are included in the HVAC system 100, when the target airflow is equal to one-quarter of the total airflow rating, the controller 102 may activate one motor 107B to cause one of the other fans 108B to provide an amount of airflow equal to one-sixth of the total airflow rating and the motor 107A to cause the fan 108A to provide an amount of airflow equal to one-twelfth of the total airflow rating.

Furthermore, it should also be noted that the control device 16 may perform the operations described herein as being performed by the controller 102. More specifically, the processing circuitry 130 of the control device 16 may execute instructions included in the application 140 to cause the processing circuitry 130 to perform the operations. For example, the control device 16 may control the motors and the fans, for example, by sending commands to the controller 102 that are relayed to components of the HVAC system 100, such as the VFD 104.

Figure 6:
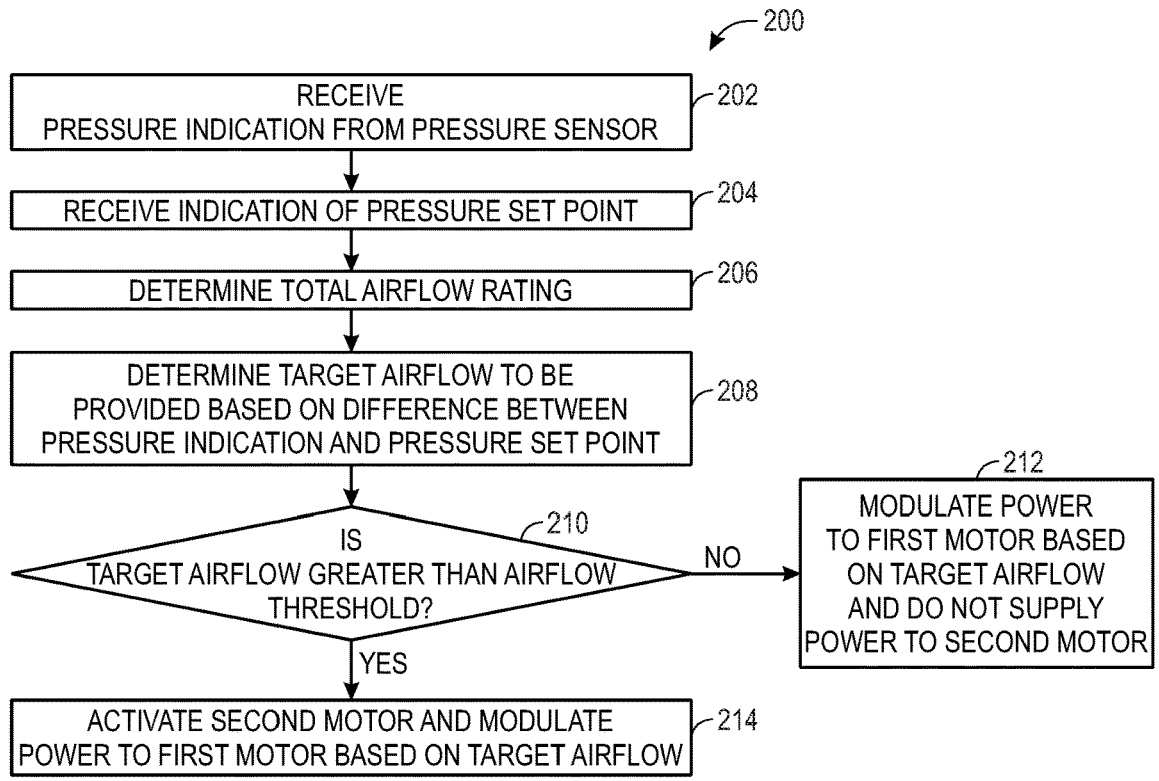
FIG. 6 is a flow diagram of a process for operating the HVAC system of FIG. 5, in accordance with aspects of the present disclosure.

Continuing with the drawings, FIG. 6 shows a flow diagram of a process 200 for controlling operation of an HVAC system 100. In some embodiments, the process 200 may be performed by the processing circuitry 120 of the controller 102 by executing the application 140. Furthermore, while the operations of the process 200 are described in a particular order below, it should be noted that, in other embodiments, the operations of the process 200 may be performed in a different order.

At process block 202, the processing circuitry 120 may receive an indication of air pressure measured within the conditioned space, for example, by a pressure sensor 110. At process block 204, the processing circuitry 120 may receive an indication of an air pressure setpoint or target air pressure from the control device 16. Additionally, at process block 206, the processing circuitry 120 may determine a total airflow rating or maximum flow rate of an HVAC unit 12. In some embodiments, the total air flow rating may be predetermined and stored in memory 122 and/or storage 124, for example, by a manufacturer or a system integrator.

At process block 208, the processing circuitry 120 may determine a target airflow to be provided based on the measured air pressure and the air pressure setpoint received from the control device 16. For example, when the pressure indicated by the pressure sensor 110 deviates from the pressure setpoint by one amount, the processing circuitry 120 may determine one target airflow. When the pressure indicated by the pressure sensor 110 deviates from the pressure setpoint by a larger amount, the processing circuitry 120 may determine that a relatively larger amount of airflow should be provided. Conversely, when the pressure indicated by the pressure sensor 110 deviates from the pressure setpoint by a smaller amount, the processing circuitry 120 may determine that a relatively smaller amount of airflow should be provided.

At decision block 210, the processing circuitry 120 may determine whether the target airflow is greater than an airflow threshold. For example, in an embodiment of the HVAC system that includes one motor 107A and another motor 107B, the threshold may be one half of the total airflow rating. When the processing circuitry 120 determines that the target airflow is less than the threshold, at process block 212, the processing circuitry 120 may modulate power to the motor 107A via the VFD 104 based on the target airflow and not utilize the motor 107B. In other words, the processing circuitry 120 may cause the VFD 104 to provide electrical power to the motor 107A to cause the fan 108A to provide the target airflow.

However, if the processing circuitry 120 determines that the target airflow to be provided is greater than the airflow threshold, at process block 214, the processing circuitry 120 may activate the second motor 107B and modulate electrical power supplied to the first motor 107A based on the target airflow. For example, by activating the second motor 107B, the processing circuitry 120 may cause the second fan 108B to provide an amount of airflow equal to the airflow threshold. The first motor 107A may be supplied with electrical power output from the VFD 104 to cause the first fan 108A to provide an amount of airflow that is generally equal to the target airflow minus airflow threshold. For instance, if the target airflow is equal to sixty percent of the total airflow rating, the controller 102 may cause the second fan 108B to provide an amount of airflow equal to fifty percent of the total airflow rating and the first fan 108A to provide an amount of airflow equal to ten percent of the total airflow rating.

Furthermore, it should be noted that the process 200 may generally be performed by the processing circuitry 130 of the control device 16. For example, the processing circuitry 130 of the control device 16 may receive a pressure indication from the pressure sensor, determine a pressure setpoint, and determine a target airflow based at least in part on a difference between the measured air pressure and the air pressure setpoint. Moreover, the control device 16 may send a command to the controller 102, which may be relayed to the motors 107 to cause the VFD 104 and/or the motors 107 to drive the fans 108 in accordance with the techniques described above.

Accordingly, the present disclosure is directed to an HVAC system in which multiple fans are employed to provide airflow to a conditioned space. In particular, by utilizing a single fan assembly that is controlled by a VFD, only one VFD that is capable of modulating power provided to a motor that drives the a fan may be used to provide an adjustable amount of airflow to the conditioned space. Accordingly, relative to systems in which more than one VFD is used or in which a VFD with a relatively larger capacity is used, the presently disclosed techniques can be performed using one VFD with a relatively smaller capacity.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilating, and air conditioning (HVAC) unit configured to supply conditioned air to a conditioned space, the HVAC unit comprising:
   a first exhaust fan capable of operating at variable speeds;
   a second constant-speed exhaust fan; and
   a controller configured to:

determine a target supply airflow rate to be provided to the conditioned space;

cause actuation of the first exhaust fan at a variable fan speed when the target supply airflow rate is greater than zero; and cause actuation of the second constant-speed exhaust fan and modulation of the first exhaust fan when the target supply airflow rate is greater than an airflow threshold.

2. The HVAC unit of claim 1, wherein the controller is configured to cause the first exhaust fan to operate at a first speed based on the target supply airflow rate relative to a total airflow rating of the HVAC unit.

3. The HVAC unit of claim 2, wherein the airflow threshold is one half of the total airflow rating of the HVAC unit.

4. The HVAC unit of claim 1, comprising a variable frequency drive (VFD) configured to modulate an amount of power provided to a motor that drives the first exhaust fan at a desired speed.

5. The HVAC unit of claim 1, wherein the controller is communicatively coupled to a pressure sensor disposed within the conditioned space and configured to collect data regarding an air pressure within the conditioned space to facilitate determining the target supply airflow rate.

6. The HVAC unit of claim 5, wherein the controller is configured to:

receive the data regarding the air pressure within the conditioned space;

receive data indicative of a pressure setpoint associated with the conditioned space; and control the first exhaust fan and the second constant-speed exhaust fan based on a difference between the air pressure and the pressure setpoint.

7. The HVAC unit of claim 6, wherein the controller is communicatively coupled to a control device disposed within the conditioned space that is configured to determine the pressure setpoint and send the pressure setpoint to the controller.

8. The HVAC unit of claim 7, wherein the control device comprises the pressure sensor.

9. The HVAC unit of claim 1, comprising a switching device configured to be electrically coupled to a power source and communicatively coupled to the controller, wherein the controller is configured to cause actuation of the second constant-speed exhaust fan by causing the switching device to electrically couple the power source to a motor configured to drive the second constant-speed exhaust fan.

10. The HVAC unit of claim 1, comprising a third constant-speed exhaust fan and a fourth constant-speed exhaust fan configured to direct air to the conditioned space, wherein the controller is configured to cause actuation of the third constant-speed exhaust fan and the fourth constant-speed exhaust fan based on the target supply airflow rate.

11. A tangible, non-transitory, computer-readable medium storing instructions that, when executed by processing circuitry, cause the processing circuitry to:

receive data regarding an air pressure within a conditioned space;

receive data indicative of a pressure setpoint associated with the conditioned space;

determine a target supply airflow rate to be provided to the conditioned space based on a difference between the air pressure and the pressure setpoint; and control modulation of a first exhaust fan configured to operate at variable speeds and actuation of a second constant-speed exhaust fan based on the target supply airflow rate.

12. The tangible, non-transitory, computer-readable medium of claim 11, wherein the instructions, when executed by the processing circuitry, are configured to cause the processing circuitry to:

control the second constant-speed exhaust fan by causing the second constant-speed exhaust fan to be electrically disconnected from a power source when the target supply airflow rate is less than an airflow threshold.

13. The tangible, non-transitory, computer-readable medium of claim 12, wherein the airflow threshold corresponds to a portion of a total airflow rating of a heating, ventilating, and air conditioning (HVAC) unit.

14. The tangible, non-transitory, computer-readable medium of claim 13, wherein, when the target supply airflow rate is greater than the airflow threshold, the instructions, when executed by processing circuitry, cause the processing circuitry to:

instruct the second constant-speed exhaust fan to provide a first airflow approximately equal to the airflow threshold; and instruct the first exhaust fan to provide a second airflow equal to a difference between the target supply airflow rate and the first airflow.

15. The tangible, non-transitory, computer-readable medium of claim 14, wherein the airflow threshold is one half of the total airflow rating for the HVAC unit.

16. The tangible, non-transitory, computer-readable medium of claim 12, wherein the instructions, when executed by processing circuitry, cause the processing circuitry to control operation of a third exhaust fan and a fourth exhaust fan based on the target supply airflow rate.

17. The tangible, non-transitory, computer-readable medium of claim 16, wherein the instructions, when executed by processing circuitry, cause the processing circuitry to control operation of the third exhaust fan by:

instructing a switching device to electrically couple a power source to a motor configured to drive the third exhaust fan to cause the third exhaust fan to operate at a constant fan speed when the target supply airflow rate is greater than one-half of a total airflow rating of a heating, ventilating, and/or conditioning (HVAC) unit; and instructing the switching device to electrically disconnect the power source from the motor when the target supply airflow rate is less than or equal to one-half of the total airflow rating.

18. The tangible, non-transitory, computer-readable medium of claim 17, wherein the instructions, when executed by processing circuitry, cause the processing circuitry to control operation of the fourth exhaust fan by:

instructing a second switching device to electrically couple the power source to a second motor configured to drive the fourth exhaust fan to cause the fourth exhaust fan to operate at an additional constant fan speed when the target supply airflow rate is greater than three-quarters of the total airflow rating; and instructing the second switching device to electrically disconnect the power source from the second motor when the target supply airflow rate is less than or equal to three-quarters of the total airflow rating.

19. A control system of a heating, ventilating, and air conditioning (HVAC) system comprising control circuitry configured to:

determine a target airflow rate of supply air to be provided by an HVAC unit to a serviced space;

cause actuation of a first exhaust fan in the HVAC unit capable of operating at variable speeds when the target airflow rate is greater than zero; and cause actuation of a second, constant speed exhaust fan in the HVAC unit and modulation of the first exhaust fan when the target airflow rate is greater than an airflow threshold.

20. The control system of claim 19, wherein the control circuitry is configured to be communicatively coupled to a pressure sensor that collects sensor data indicative of air pressure within the serviced space.

21. The control system of claim 20, comprising a thermostat deployed within the serviced space, wherein the thermostat comprises processing circuitry, and wherein the processing circuitry is configured to determine a pressure setpoint associated with the serviced space.

22. The control system of claim 21, comprising a controller deployed in the HVAC unit, wherein the controller is configured to determine the target airflow rate based on a difference between the pressure setpoint and the air pressure within the serviced space.

23. The control system of claim 21, wherein the processing circuitry is configured to determine the target airflow rate based on the air pressure within the serviced space.

24. The control system of claim 19, wherein the HVAC unit comprises a rooftop HVAC unit.

25. The control system of claim 19, comprising a motor drive configured to modulate an amount of power provided to a motor that drives the first exhaust fan to cause the first exhaust fan to operate at a variable fan speed.

26. The control system of claim 19, wherein the control circuitry is configured to actuate the second, constant speed exhaust fan at a constant fan speed when the target airflow rate is greater than the airflow threshold.

* * * * *